United States Patent [19]
Westerhof et al.

[11] Patent Number: 5,739,215
[45] Date of Patent: Apr. 14, 1998

[54] USE OF A POLYESTER IN THE PREPARATION OF COATINGS FOR THE INTERIOR OF CAN ENDS

[75] Inventors: Wilhelmina Westerhof; Dirk J. Kolk, both of Zwolle; Wilhelmus J. P. S. M. van Riggelen, Almelo, all of Netherlands

[73] Assignee: DSM N.V., Heerlen, Netherlands

[21] Appl. No.: 702,872

[22] Filed: Aug. 26, 1996

Related U.S. Application Data

[63] Continuation of PCT/NL95/00065, Feb. 20, 1995.

[30] Foreign Application Priority Data

Feb. 28, 1994 [EP] European Pat. Off. .............. 94200514

[51] Int. Cl.$^6$ ...................................................... C08L 67/02
[52] U.S. Cl. ......................... 525/438; 525/442; 525/443
[58] Field of Search ................................. 525/438, 443, 525/442

[56] References Cited

U.S. PATENT DOCUMENTS

| | | | |
|---|---|---|---|
| 4,018,848 | 4/1977 | Khanna | 260/834 |
| 5,288,559 | 2/1994 | Oka et al. . | |
| 5,290,828 | 3/1994 | Craun et al. | 523/423 |

FOREIGN PATENT DOCUMENTS

| | | |
|---|---|---|
| 31977 | 7/1981 | European Pat. Off. . |
| 150476 | 8/1985 | European Pat. Off. . |
| 0 538 774 | 4/1993 | European Pat. Off. . |
| 3401559 | 7/1985 | Germany . |
| 40 10 167 | 10/1991 | Germany . |
| 55-56163 | 4/1980 | Japan . |
| 55-56164 | 4/1980 | Japan . |
| 60-181169 | 9/1985 | Japan . |

OTHER PUBLICATIONS

Patent Abstracts of Japan, vol. 17, No. 391 (C–1087), Jul. 22, 1993 (JPA 5–70737 (Toyobo Co., Ltd.), Mar. 23, 1993.
DATABASE WPI, Week 4962, Derwent Publications Ltd., London, GB; AN 82–05469J JPA 57 175 550, (Kishimoro), Oct. 28, 1982.
DATABAE WPI, Week 0392, Derwent Publications Ltd., London, GB, AN 92–020227, JPA 03 268 938 (Kobe Steel KK), Nov. 29, 1991.
PMSE, Polymeric Materials Science and Engineering, PVC in Container Coatings and Approaches to its Replacement, vol. 65, Fall Meeting 1991, New York, New York, pp. 285–286.
Palackdharry et al., PMSE, 'Organic Coatings For Beer, Beverage and Food Metal Containers', vol. 65, Fall Meeting 1991, New York, NY, pp. 277–278.

*Primary Examiner*—Erma Cameron
*Attorney, Agent, or Firm*—Cushman Darby & Cushman IP Group of Pillsbury Madison & Sutro, LLP

[57] ABSTRACT

The invention relates to the use of a hydroxyl functional polyester having a glass transition temperature of at least 40° C., a hydroxylnumber between 5 and 150 mg KOH/gram resin, a molecular weight (Mn) between 800 and 10.000 and a molecular weight (Mw) between 8000 and 100.000 in the preparation of coatings for the interior of can ends. The polyester has to be crosslinked with for example an amino resin or an epoxy resins.

9 Claims, No Drawings

5,739,215

USE OF A POLYESTER IN THE PREPARATION OF COATINGS FOR THE INTERIOR OF CAN ENDS

This application is a continuation of PCT/NL95//00065, filed Feb. 20, 1995.

The invention relates to the use of a polyester in the preparation of coatings for the interior of can ends.

Coating compositions for the inside of beer, beverage and food cans must be approved for direct food contact. The fundamental function of the inside coatings on cans and ends (see for example "Polymeric Materials Science and Engineering", Volume 65, Fall Meeting 1991, New York, pages 277–278) is to protect the packed product to maintain its nutritional value, texture, color and flavor when purchased and used by the consumer. To meet these requirements, the organic film must be free of any material which might extract into the packed product and must maintain its integrity over the product recommended shelf life. The ingredients in the can must not make contact with the metal surface. On the whole, current commercial coating compositions for cans and ends, have met all these performance criteria. The precoated metal sheets are subjected to severe elongative and compressive stresses during the can forming process of the fabrication of can ends. The integrity of the respective coating must be maintained during all the specific fabrication operations. The easy open ends, for two-piece beverage cans for example, are stamped from precoated aluminium coil and are fed through a serie of presses where the rivet, scaring and tab making steps occur. Coatings for ends must be highly flexible to withstand this series of operations.

The inside coatings for can ends (also referred to as "lids") are based on solutions of either polyvinylchloride or dispersion type polyvinylchloride (hereinafter collectively referred to as "PVC").

However, the article "PVC in container coatings and approaches to its replacement" by M. Hickling (Polymeric Materials Science and Engineering, Volume 65, American Chemical Society, Fall Meeting 1991, New York, pages 285–286) elucidates that there exists a need for PVC replacement by other resins.

The performance offered by PVC coatings is somewhat offset by the fact that unstabilized PVC degrades above 100° C. by elimination of HCl. The release of HCl can initiate corrosion reactions particularly on steel substrates. Hence, great care is needed in organosol formulation to ensure fineness of grind and adequate thermal stabilization. This degradation has caused complications in recycled and incineration of PVC containing waste. The chlorine content of steel recovered from such waste has been considered too high for many uses, but the amount of steel recovered in this way is rarely high enough to be significant. The polyenes produced also undergo secondary reactions in which it is possible to produce aromatic groups. These may generate dioxins whose presence can be detected in the emissions from incinerators burning PVC containing materials. The most dramatic reaction to this has been in Holland where it was claimed that the detection of dioxins in milk sold through supermarkets resulted from contamination of cattle grazing land by a waste incinerator. This claim led to demands by environmental groups (supported by supermarkets in Holland and Germany and later by major food and beverage packers) for the removal of PVC from packaging materials.

It is the object of the present invention to provide resins which can be used to replace PVC in the preparation of coatings for the interior of can ends and which also meet the severe conditions of can end production.

These resins have also particularly to meet requirements relating to acetic acid extraction tests such as those demanded for can coatings by the CIVO laboratories in The Netherlands. Work in various systems has shown some initial promise in fabrication performance but most have fallen down in general pack resistance properties and particularly in the so called "CIVO migration test". This test is described in "Verpakking en gebruiksartikelen besluit B1 par. 4.2. (Government printing office, VGB, 5$^e$ suppl., January 1992, pages 262–263)". Conditions for these tests are set out in "Richtlijn 93/8/EEG of the Commission of 15 Mar. 1993" (Nr. L 90/22, Publikatieblad van de Europese Gemeenschappen, 14.4.93).

The invention is characterized in that the resin is a hydroxyl functional polyester having a glass transition temperature (Tg) of at least 40° C., a hydroxyl number between 5 and 150 mg KOH/gram resin, a molecular weight (Mn) between 800 and 10,000 and a molecular weight (Mw) between 8000 and 100.000.

The solids content of the polyester generally ranges between about 45% and about 80% and, preferably, between about 50% and about 65%.

The present invention provides a resin which can be used to replace PVC in the preparation of coatings compositions for the interior surfaces of cans and can ends. The present invention also provides a resin composition which satisfies the above-noted criteria and requirements, as well as conforming with the guidelines set for acetic acid extraction tests, such as those demanded for can coatings by the CIVO laboratories in Holland.

The requirements relating to physical characteristic application properties and film performance of the resulting coating such as for example a stable predetermined viscosity of the wet coating composition, a flow evenly on application to avoid dewetting, wrinkling or perforations, no air drying or solids accumulation on coater, relatively wide cure window, good adhesion, develop hardness for abrasion, mar and block resistance, resistance to yellowing and overbake, maintain integrity during pasteurization and sterilization processes, enhance mobility for high speed can end production, maintain film integrity on can end fabrication, countersink, score and rivet areas of converted ends, and porosity are good.

More preferably, the resin of the present invention has a glass transition temperature of at least 50° C. Generally, the glass transition temperature is lower than 100° C.

More preferably, the hydroxyl number of the polyester is between 50 and 100 mg KOH/gram resin.

The number-average molecular weight (Mn) is determined by gel permeation chromatography (GPC) on a polystyrene standard and the weight-average molecular weight (Mw) is also determined by GPC.

A polyester containing a hydroxyl-functional group can be obtained by reacting polyalcohols with acids or acid anhydrides. For preparing a hydroxyl-functional polyester, a molar ratio of polyalcohols to acids or acid anhydrides is preferably selected between about 1.2:1.0 and about 1.0:1.0.

Exemplary polyalcohols for preparing the functional group containing polyesters include ethylene glycol, propylene glycol (1,2), propylene glycol (1,3) methylpropylene glycol (1,3), diethylene glycol, butanediol (1,2), butanediol (1,3), butanediol (1,4), hexanediol (1,6), neopentyl glycol, 2,2,4 trimethylpentanediol (1,3), ester of hydroxypivalic neopentyl glycol, tricyclodecanedimethanol, cyclohexanedimethanol, bisphenol-A-bishydroxyethyl ether, bisphenol-A-epoxy resins, trimethylolpropane, pentaerythritol, and the like.

Suitable acids for preparing the functional-group containing polyesters include, by way of example, isophthalic acid, terephthalic acid (dimethylester of terephthalic acid or isophthalic acid), adipic acid, fumaric acid, sebacic acid, hexahydroterephthalic acid, decanedicarboxylic acid, azelaic acid, 5-t-butylisophthalic acid, dimerised fatty acids, and the like. Suitable acid anhydrides for preparing the functional-group containing polyesters include, by way of example, phthalic anhydride, tetrahydrophthalic anhydride, succinic anhydride, maleic anhydride, trimellitic anhydride, pyromellitic anhydride, hexahydrophthalic anhydride, and the like.

The polyester prepared in accordance with the present invention can be branched to provide a resulting coating with improved adhesion and flexibility (before and after the migration tests) in acetic acid as compared with linear polyesters. The branched polyesters preferably contain trifunctional or a higher functional polycarboxylic acid (or anhydride) or polyol components in an amount preferably not greater than about 15 mol %, and more preferably between about 6 mol % and about 12 mol % with respect to the total amount of acid or polyalcohol.

The esterification reaction is preferably conducted in a nitrogen atmosphere at temperatures between about 180° C. and about 260° C. Preferred catalysts for this reaction include dibutyltin oxide, tin chloride, and tetrabutoxy titanate. Antioxidants such as, by way of example, triphenyl phosphite, can be included as additives. Water released during the esterification reaction is removed by distillation. The degree of esterification is controlled by means of azeotropic distillation or vacuuming conducted in the last phase of the reaction. The reaction produces a resultant polyester than subsequently can be dissolved or emulsified in water, an organic solvent, or a mixture of solvents. Exemplary solvents include aromatic hydrocarbons (e.g., SOLVESSO 200 (Esso)), esters of glycol ethers (e.g., methylpropylene glycol acetate (MPA)), ethylpropylene glycol acetate, and the like.

Next, the hydroxyl functional polyester is crosslinked. The crosslinking is essential because in absence of the crosslinking agent the polyester according to the present invention will result in brittle products which are unsuitable for any deformation operation. Examplary crosslinkers include an amino group containing resin, an epoxy group containing resin, a phenoxy group containing resin, an epoxyphosphate ester, a phenolic resin and the like.

Preferably, amino resins and epoxy resins are selected.

Suitable amino resins include by way of example benzoguanamine resins, melamine resins and/or urea-formaldehyde resins.

Preferably, the amino resin is a benzoguanamine resin and/or melamine resin.

Preferred epoxy resins include, by way of example, bisphenol-A-epoxy compounds, hydrogenated bisphenol-A-epoxy compounds and aliphatic epoxy compounds. Preferably, bisphenol-A-epoxy compounds, such as by way of example the diglycidyl ether of bisphenol-A and oligomers thereof are selected. Suitable epoxy resins generally have an epoxy equivalent weight between about 150 and about 4000.

The weight ratio of polyester to amino resin and/or epoxy resin generally ranges between 95:5 and 60:40 (based on solid resin).

Suitable catalyst for the curing reaction include, for example, p-toluene sulfonic acid, methane sulfonic acid, nonylbenzene sulfonic acid, dinonylnapthalene disulfonic acid, dodecylbenzene sulfanoic acid, phosphoric acid, mono and dialkyl acid phosphate, butyl phosphate, and/or butyl maleate.

Generally, a cured coating must have a glass transition temperature of at least 40° C.

The can ends are coated by roll coat applications to a dry thickness of about 0.23 to about 1.86 mg/cm$^2$. The coatings are cured by heating in ovens to metal temperatures of about 160° C. to about 260° C. The total residence time in the ovens will vary from about 2 seconds to about 12 minutes.

The coatings on metal sheets which are to be fabricated into can ends, particularly can ends which contain easy-opening tabs, can be cured by two different processes. One process, called the "sheet bake process", involves coating metal sheet having dimensions of about 88.9 cm by 91.4 cm. These sheets are then placed upright in racks and are placed in ovens for about 7 to about 12 minutes at peak metal temperatures of about 160° C. to about 210° C. The other process is a "coil coating" process. Enormous rolls of thin gauge steel or aluminium are unwound, coated, heat cured and rewound. The total heating time in the oven is about 8 to about 30 seconds with peak metal temperatures reaching about 204° to about 280° C.

In the leaflet "Dow Epoxy Resins; container and coil coatings" from Dow Plastics a beverage can end making process is described. The beverage can end making process begins with a coil of coated aluminium material. The material is continously fed through a press where thousands of basic ends are formed each minute. The curl is formed simultaneously with the basic end, which is conveyed to a robotic end line machine. This machine distributes ends to the liners, or stores them as needed, balancing the production flow. The lining machine applies a very precise bead of compound sealant in the curl of the end. The ends then move through a video inspection system to check for defects. The ends move through series of dies to score the end, attach the tab and emboss, if required. The finished product is the familiar easy open end. The finished ends are conveyed to the palletiser, where they are packaged in paper sleeves (palletised) prior to shipment to the customer.

There are many types of metal containers. They include for example two- and three-piece beer and beverage cans, two- and three-piece food cans, aerosol cans, open and closed head steel drums, and pails. Metal substrates for these containers include for example aluminium, tin plate, and other pre-treated steels. Each type of container has its own coating requirements, determined by the can design, the coating application process and the product to be packaged. Consequently, it is not possible simply to interchange resins for application in said types.

EP-A-538774 discloses a polyester composition for precoating sheet metal for two piece cans. The composition comprises a specific polyester resin, which has to be based on terephtalic acid and propylene glycol. The polyester has to be crosslinked with etherified aminoformaldehyde resins to improve the elongation and the tensile strength whereas the crosslinking of the polyesters according to the present invention is essential to obtain good mechanical properties. The polyester according to EP-A-538774 contains 0.1 to 3.0 mol % of tri- or more functional polycarboxylic acids and has a reduced viscosity of 0.3 or more and is basically a high molecular weight polyester resin because of its reduced viscosity of 0.3 or more. This branched polyester resin having a reduced viscosity will only have an acid/hydroxyl value of which the sum will never be higher then about 25. Furthermore, these resins will never have resin solids (at reasonable viscosities) higher than 50%. In contrast, the polyester resin according to the present invention is preferably a low/medium molecular weight polyester resin having a degree of branching of 6–12 mol %, a hydroxyl number between 50 and 100 and a resin solids of 50–65%. This essential difference becomes clear during the application of the product because the polyesters according to EP-A-538774 are used for 2 piece cans providing coatings with excellent resistance towards blistering, whitening, corrosion and (lactic)acid after sterilization for 30 min. and 130° C. The polyesters according to the present inention are specifically used for can ends providing coatings with excellent acetic acid resistance (CIVO test) after pasteurization for 30 minutes and 85° C. EP-A-538774 does not relate to coatings for can ends which have special requirements. The requirements with respect to the properties of a coating (and consequently with respect to the resins for these coatings) are different in the process of manufacturing two piece cans and in the process of manufacturing can ends because the deformation requirements of the coated substrates are totally different.

The invention will be further elucidated by the following examples without, however, being limited thereto.

EXAMPLES

Example I

Preparation of a polyester resin 8.4 moles ethyleneglycol (EG), 1.4 moles propyleneglycol (PG), 0.9 moles trimethylolpropane (TMP), 3.7 moles terephthalic acid (TPA), 6.3 moles isophtalic acid (IPA) and 0.05 part by weight dibutyltinoxide were heated in a glass reaction flask with a mechanical stirrer, a thermometer and a distillation arrangement with a condenser, in a nitrogen atmosphere. The esterification reaction started at 180° C. and the reaction water formed was removed by distillation. The polyester was dissolved in a mixture of solvents in a weight ratio Solvesso 200: methyl propylene glycol acetate 4:1. The maximum reaction temperature was 230° C. At 230° C. azeotropic distillation was started using xylene until an acid number lower than 7 was reached.

The polyester had the following characteristics:

Tg: 53° C.

hydroxyl value: 60 mg KOH/gram resin acid value: 3 mg KOH/gram resin

Mw: 60.000 solids content: 55%

Comparative Example A

Preparation of a polyester 8.4 moles ethyleneglycol, 1.4 moles propyleneglycol, 0.9 moles trimethylolpropane, 3.6 moles terepthalic acid, 4.5 moles isophthalic acid, 1.9 moles adipic acid and 0.05 parts by weight dibutyltinoxide were subjected to the same conditions and steps of Example I.

The polyester had the following characteristics:

Tg: 23° C.

hydroxyl value: 60 mg KOH/gram resin acid value: 3 mg KOH/gram resin

Mw: 60.000 solids content: 55%

Example II

Preparation of a coating 31.6 parts by weight of a resin according to Example I were dissolved in 45.1 parts by weight of a mixture of solvents of aromatic hydrocarbons (DowaNol PM™)/n-butylacetate/aromatic hydrocarbon (SolvEsso 150)/butylglycol/n-butanol (in a weight ratio 18:3:60:17:2), 6.6 parts by weight benzoguanamine resin, 6.6 parts by weight hexamethoxymelamine resin, 9.5 parts by weight epoxy novolac resin and 0.6 parts by weight of dodecylbenzenesulfonic acid as catalyst.

Comparative Example B

Preparation of a coating

The method of Example II was repeated with the polyester according to Comparative Example A instead of the polyester according to Example I.

The coatings were applied with a roller-coater on an aluminium substrate used for beer and beverage easy open can ends. The curing conditions and coating weight are set forth in Table I.

TABLE I

|  | EXAMPLE II | EXAMPLE B |
|---|---|---|
| Viscosity, DIN cup 4 (DIN norm 53211) | 100" | 105" |
| Solids content | 54,3% | 54,3% |
| Curing conditions: | 20" at 270° C. reaching a PMT 241° C.–254° C. | 20" at 270° C. reaching a PMT 241° C.–254° C. |
| Coating weight mg/inch$^2$ | 7–8 | 7–8 |

The properties of the coatings are summarized in Table II.

TABLE II

|  | II | B |
|---|---|---|
| a) MEK resistance (DR) | 100 | 90 |
| b) Wedgebend, % crackfree (mm) | 95 | 70 |
| c) Pasteurisation resistance (30' at 85° C.): |  |  |
| -c1) Blushing | 5 | 4 |
| -c2) Adhesion | 5 | 4 |
| d) Flexibility can end | 5 | 4 |
| e) Porosity can end (mA) | 0,5 | 5 |
| f) CIVO-test: |  |  |
| -f1) Blushing | 5 | 1 |
| -f2) Adhesion | 5 | 4 |
| -f3) Aluminium migration in acetic acid (mg/L) | 0,2 | 38 |

These properties were determined and are defined as follows:

(a) MEK Resistance

This test is conducted to determine solvent resistance. The MEK resistance (DR) is determined by counting the number of double rubs (forwards and back=1 double rub) necessary to remove the coating and expose the metal thereunder. Rubbing is conducted with a piece of cotton wool soaked in a solvent (methyl ethyl ketone). The results are reported as a number of double rubs from 0 to 100 (required rubs of over 100 are reported as ">100").

(b) Wedge bend

This test is conducted to determine flexibility. A cooled panel (100 mm by 40 mm) is bent over a 6 mm cylindrical mandrel. The folded panel thus produced is then impacted (4.5 Nm) in a device (a wedge-end tester) to form a wedge-shaped contour that is flat at one end and has a 6 mm diameter at the other end. The test piece is then immersed in acidified (3% hydrochloric acid) saturated copper sulphate solution for 4 minutes in order to stain any cracks in the coating. The distance (in millimeters) which is crackfree is measured. The percentage of crackfree distance is recorded. A higher percent of crackfree distance corresponds to a higher flexibility.

(c) Pasteurization resistance

This test is conducted to determine the adhesion and blush resistance of the coating after being submerged in hot water (85° C.) for 30 minutes. Next, the coated can ends are removed from the water, dried, and cross-hatched by a scribe with at least 3 vertical and 3 horizontal lines. No. 610 Scotch brand cellophane tape ("SCOTCH" and "CELLOPHANE" trademarks) is firmly placed over the crosshatched area and is then pulled straight up from the surface of the panel.

The blush resistance of the coatings is also determined by observing the coating for 5 minutes after removal of the water. Blushing is a milky discoloration or haze in the film, generally uniform over the whole area, but sometimes blotchy or spotty.

Both the degree of blushing and adhesion is expressed on a numerical scale in which 1=poor; 2=insufficient; 3=moderate; 4=good; and 5=very good.

(d) Flexibility of the can ends

The can end (206 shell) stamped out of the precoated aluminum is immersed in acidified (3% hydrochloric acid) saturated copper sulphate solution in order to stain any breaks in the coating. The flexibility was expressed on a numerical scale in which 1=poor; 2=insufficient; 3=moderate; 4=good; and 5=very good. A rating of 5 indicates no breaks.

(e) Porosity of coating on the can ends

The porosity of the coating is determined after fabrication of the can end is complete. An enamel rater test is used to determine the amount of metal exposure (measured in milliamperes) after the coated metal has been fabricated into can ends. This test was conducted using a Waco Enamel Rater with an Enamel Rater end-cup attachment. The end-cup, which contains an electrode, is about half filled with 1 percent electrolyte solution. The can end is placed on the cup with the coated side facing the inside of the cup. The cup is then rotated so that the electrode solution is in contact with the coated end. The electrode in the cup should be covered by the electrolyte solution. The other electrode is placed in contact with the uncoated side of the can end. A 6.3 Volt potential is applied between the two electrodes for 5 seconds. Any current leakage is measure in milliamperes.

(f) CIVO-test

Coating on the can end (206 shell) is tested for 2 hours at 70° C. in 3% acetic solution, followed by 10 days at 40° C. in 3% acetic solution. After the CIVO-test, the can ends were judged for: (f1) blistering; (f2) adhesion; and (f3) aluminum migration (the concentration (in mg/L) of aluminum is measured in the acetic acid solution). The blistering and adhesion were expressed on a numerical scale in which 1=poor; 2=insufficient; 3=moderate; 4=good; and 5=very good.

The results of these experiments demonstrate that the use of a polyester according to the present invention results in a coating having good mechanical properties and in a very low migration of aluminum in acetic acid solution.

Although the present invention has been described in detail with reference to its presently preferred embodiments, it will be understood by those of ordinary skill in the art that various modifications and improvements to the present invention are believed to be apparent to one skilled in the art. Accordingly, no limitation upon the invention is intended, except as set forth in the appended claims.

We claim:

1. A curable can coating composition for the interior surface of a can end which comprises (i) a hydroxyl functional polyester having a glass transition temperature of at least 40° C., a hydroxyl number between 5 and 150 mg KOH/gram resin, a number-average molecular weight (Mn) between 800 and 10,000, a weight-average molecular weight (Mw) between 8,000 and 100,000 or (ii) a combination of the polyester of (i) and a crosslinker capable of crosslinking said polyester, and wherein said can end comprises a metal.

2. A coating composition according to claim 1, wherein the hydroxyl number is between about 50 and about 100 mg KOH/gram resin.

3. A coating composition according to claim 2, wherein the crosslinker is selected from the group consisting of an amino resin, an epoxy resin, a phenoxy resin, an epoxy-phosphate ester, and a phenolic resin.

4. A coating composition according to claim 3, wherein the crosslinker is an amino resin selected from the group consisting of a benzoguanamine resin and a melamine resin.

5. A coating composition according to claim 3, wherein the crosslinker is an epoxy resin selected from the group consisting of bisphenol-A-epoxy compounds, hydrogenated bisphenol-A-epoxy compounds, and aliphatic epoxy compounds.

6. A coating composition according to claim 5, wherein the epoxy resin is a bisphenol-A-epoxy compound.

7. A coating composition according to claim 1, wherein the hydroxyl functional polyester has a glass transition temperature of at least 50° C.

8. A coating composition according to claim 1, wherein the hydroxyl functional polyester has a solids content of between about 50% and about 65%.

9. A coating composition according to claim 1, wherein said metal comprises at least one material selected from the group consisting of aluminum, tin plate, and steel.

* * * * *